United States Patent
Maruyama et al.

(10) Patent No.: US 6,307,733 B1
(45) Date of Patent: Oct. 23, 2001

(54) ALUMINUM ELECTROLYTIC CAPACITOR

(75) Inventors: Takaaki Maruyama, Matsumoto; Yoshishige Ikeda, Nagano-ken; Noburo Kuroki, Matsumoto, all of (JP)

(73) Assignee: Nichicon Corporation, Kyoto (JP)

( * ) Notice: Subject to any disclaimer, the term of this patent is extended or adjusted under 35 U.S.C. 154(b) by 0 days.

(21) Appl. No.: 09/491,381

(22) Filed: Jan. 26, 2000

(30) Foreign Application Priority Data

| Jan. 27, 1999 | (JP) | 11-018326 |
| May 11, 1999 | (JP) | 11-129651 |
| Jul. 8, 1999 | (JP) | 11-193836 |
| Jul. 19, 1999 | (JP) | 11-205284 |

(51) Int. Cl.$^7$ .................................................. H01G 4/32
(52) U.S. Cl. .................. 361/511; 361/511; 361/512; 361/509; 361/528
(58) Field of Search ................................ 361/511, 525, 361/523, 528, 532, 504, 512, 508, 509

(56) References Cited

U.S. PATENT DOCUMENTS

| 2,218,162 | 10/1940 | Brock . | |
| 5,160,653 | * 11/1992 | Clouse et al. | 252/62.2 |
| 5,379,181 | * 1/1995 | Ishii | 361/511 |
| 5,629,829 | * 5/1997 | Ikeya | 361/505 |
| 5,870,275 | * 2/1999 | Shiono et al. | 361/504 |
| 5,914,852 | * 6/1999 | Hatamaka et al. | 361/523 |
| 6,021,040 | * 2/2000 | Suzuki et al. | 361/514 |
| 6,045,950 | * 4/2000 | Chang | 429/306 |
| 6,058,006 | * 5/2000 | Yoshioka et al. | 361/511 |

FOREIGN PATENT DOCUMENTS

| 3-80523 (A) | 4/1991 | (JP) . |
| 6-181147 A | 6/1994 | (JP) . |
| 9-162079 A | 6/1997 | (JP) . |
| 9-213592 A | 8/1997 | (JP) . |
| 10-256091 A | 9/1998 | (JP) . |

OTHER PUBLICATIONS

Izaya Nagata, *Electrolyte–Cathode Aluminum Electrolytic Capacitors*, First Edition—Jun. 15, 1983, Second Edition—Feb. 24, 1997, pp. 476–479, published by Japan Capacitor Industrial Co., Ltd.

* cited by examiner

*Primary Examiner*—Dean A. Reichard
*Assistant Examiner*—Nguyen Ha
(74) *Attorney, Agent, or Firm*—Duane, Morris & Heckscher LLP

(57) ABSTRACT

An aluminum electrolytic capacitor includes an anode sheet of aluminum, a cathode sheet of aluminum, and separators disposed to sandwich either the anode sheet or the cathode sheet. Anode lead tabs of aluminum are connected to the anode sheet by "needling" or welding. Cathode lead tabs formed of an aluminum sheet are connected to the cathode sheet by "needling" or welding. The surface of each of the cathode lead tabs contacting the separator is roughened. Alternatively, an aluminum thin sheet may be disposed to overlie each of smooth-surfaced cathode lead tabs, with its surface contacting the separator roughened.

7 Claims, 5 Drawing Sheets

| | Cathode Terminal Section | | | Cathode Sheet Capacitance $\beta$ ($\mu F/cm^2$) | $\alpha/\beta$ | Figure Showing Terminal Section | Number of Explosion Valves Operated |
|---|---|---|---|---|---|---|---|
| | Terminal Section | Withstand Voltage (V) | Capacitance $\alpha$ ($\mu F/cm^2$) | | | | |
| Example 1 | Roughened Lead Tab | 1.0 | 25 | 50 | 0.5 | FIG. 3 | 0/30 |
| Example 2 | Lead Tab with Overlying Roughened Al Sheet | 1.0 | 15 | 50 | 0.3 | FIG. 4 | 0/30 |
| Example 3 | ditto | 1.0 | 25 | 50 | 0.5 | FIG. 4 | 0/30 |
| Example 4 | ditto | 1.0 | 50 | 50 | 1.0 | FIG. 4 | 0/30 |
| Example 5 | ditto | 1.0 | 250 | 50 | 5.0 | FIG. 4 | 0/30 |
| Example 6 | ditto | 1.5 | 33 | 50 | 0.66 | FIG. 4 | 0/30 |
| Example 7 | ditto | 2.0 | 25 | 50 | 0.5 | FIG. 4 | 0/30 |
| Example 8 | ditto | 1.0 | 15 | 50 | 0.3 | FIG. 5 | 0/30 |
| Example 9 | ditto | 1.0 | 25 | 50 | 0.5 | FIG. 5 | 0/30 |
| Example 10 | ditto | 1.0 | 50 | 50 | 1.0 | FIG. 5 | 0/30 |
| Example 11 | ditto | 1.0 | 250 | 50 | 5.0 | FIG. 5 | 0/30 |
| Example 12 | ditto | 1.5 | 50 | 50 | 1.0 | FIG. 5 | 0/30 |
| Example 13 | ditto | 2.0 | 25 | 50 | 0.5 | FIG. 5 | 0/30 |
| Comparison Example 1 | Smooth Lead Tab | 1.0 | 3 | 50 | 0.06 | FIG. 1 | 30/30 |
| Comparison Example 2 | Roughened Lead Tab | 1.0 | 10 | 50 | 0.2 | FIG. 3 | 11/30 |
| Comparison Example 3 | Lead Tab with Overlying Roughened Al Sheet | 1.0 | 5 | 50 | 0.1 | FIG. 4 | 15/30 |
| Comparison Example 4 | Lead Tab with Overlying Roughened Al Sheet | 1.0 | 10 | 50 | 0 | FIG. 4 | 9/30 |

Fig. 7

ALUMINUM ELECTROLYTIC CAPACITOR

This invention relates to an aluminum electrolytic capacitor including an anode and a cathode which are formed of aluminum foil.

BACKGROUND OF THE INVENTION

Many of prior art aluminum electrolytic capacitors generally have the following structure. As shown in FIG. 1, a capacitor includes a capacitor element 2 having an anode 14 including aluminum anode lead tabs 12 and an aluminum anode sheet 11 connected together. The anode sheet 11 is formed of aluminum foil. Each anode lead tab 12 has a smooth surface, and the aluminum sheet 11 has its surface roughened and has an anodized film formed thereon. Each aluminum anode lead tab 12 is connected to the aluminum anode sheet 11 by welding at suitable locations 13. Alternatively, the tabs 12 and the anode sheet 11 may be connected together by needling the stack of the tabs 12 and the anode sheet 11, bending and pressing resulting burs down against the opposite surface of the stack. (This technique is referred to as "needling" hereinafter.) Further, the capacitor element 2 has a cathode 24 including aluminum cathode lead tabs 22 and an aluminum cathode sheet 21 connected together. The cathode sheet 21 is formed of aluminum foil. Each tab 22 has a smooth surface, and the aluminum cathode sheet 21 has its surface roughened. Each aluminum cathode lead tab 22 is connected to the aluminum sheet 21 by "needling" or welding at suitable locations 23. The anode 14 and the cathode 24 are rolled together into a cylindrical shape, with separator sheets 1 sandwiching either the anode 14 or the cathode 24. The roll is then impregnated with an electrolytic solution to thereby form the capacitor element 2.

Then, as shown in FIG. 2, the capacitor element 2 is encapsulated in a cylindrical aluminum casing 3. The casing 3 has an opening, which is hermetically sealed with a sealing structure 6 including a plate 4 of synthetic resin and a rubber plate 5 disposed on the resin plate 4. The sealing structure 6 has an explosion preventing valve 7 including an aperture formed through the resin sheet 4 and a thinned portion formed in the rubber sheet 5. Metallic terminal members 10 and 20 extend through the sealing structure 6. The anode lead tabs 12 extending out of the capacitor element 2 are joined together and connected to the terminal member 10 within the casing 3, and the cathode lead tabs 22 are joined together and connected to the terminal member 20 within the casing 3. The lower portion of the capacitor element 2 is fixed to the inner surface of the casing 3 with a fixing material 8.

Referring to FIG. 6(a), the anode 14 of the above-described prior art capacitor includes the aluminum anode sheet 11 with relatively thick anodic oxide films 31 on its opposite surfaces, which result from electrolytic processing at a high voltage above a capacitor rating voltage applied thereto. The aluminum cathode sheet 21 of the cathode 24 has thin oxide films 32 on its opposite surfaces, which result from spontaneous oxidation of the sheet 21 or from electrolysis with a low voltage of several volts. The aluminum sheets for the anode lead tabs 12 and the cathode lead tabs 22 has a thickness of about 200 $\mu$m. The surfaces of the anode and cathode lead tabs 12 and 22 are not roughened by, e.g. etching. The surfaces of each anode lead tab 12 is covered with an electrochemically formed oxide film, while the surfaces of each cathode lead tab 22 is covered with an oxide film formed through spontaneous oxidation.

The above-described electrolytic capacitor charges and discharges in the following manner. As shown in FIG. 6(a), the electrostatic capacitance of the electrolytic capacitor can be considered to be a series combination of the capacitance exhibited between the anode sheet 11 and the separator 1 impregnated with the electrolytic solution, with the oxide film 31 interposed therebetween, and the capacitance exhibited between the aluminum cathode sheet 21 and the separator 1 with the oxide film 32 interposed therebetween. Since the oxide film 32 is considerably thin relative to the oxide film 31, the capacitance associated with the oxide film 32 should be far larger than the capacitance associated with the oxide film 31. On the other hand, a very large leakage current is associated with the oxide film 32. Accordingly, when a voltage V is applied between the anode sheet 11 and the cathode sheet 21 as shown in FIG. 6(a), the voltage Va across the oxide film 31 is larger than the voltage Vc across the oxide film 32. The apparent capacitance per unit area of the capacitance associated with the oxide film 31 is Ca ($\mu$F/cm$^2$), and the apparent capacitance per unit area of the capacitance associated with the oxide film 32 is Cc ($\mu$F/cm$^2$). The amounts of charge stored in these capacitances are Qa and Qc, respectively.

When the two terminals of the above-described electrolytic capacitor charged to the voltage V are connected together, the two capacitances Ca and Cc are connected in parallel as shown in FIG. 6(b), so that the voltage between the two terminals becomes Vc' due to dicharge of the charge on the smaller capacitance Cc, and charge of Qa−Qc remains. Since the overall capacitance is Ca+Cc and the stored charge is Qa−Qc, the remaining voltage Vc' is expressed by the following expression (1).

$$Vc' = (Qa - Cc)/)(Ca + Cc) = \frac{CaVa - CcVc}{Ca + Cc} \quad (1)$$

If the voltage applied across the cathode oxide film 32 during discharging is excessive, an oxide film may be further grown on the cathode sheet 21, which may cause undesirable things, such as generation of gas, to occur within the capacitor casing 3. Then, the remaining voltage Vc' expressed by the expression (1) must be equal to or smaller than the maximum voltage V' which can be applied across the cathode oxide film 32 without growing any additional oxide film during discharging. In other words, the condition expressed by the following expression (2) must be met during discharge.

$$V' \geq \frac{CaVa - CcVc}{Ca + Cc} \quad (2)$$

Since Va=V−Vc, the following expression (3) can be derived from the expression (2).

$$V' \geq \frac{V}{1 + (Cc/Ca)} - Vc \quad (3)$$

A ripple waveform resulting from rectifying an AC voltage and a rectangular charge and discharge voltage waveform contain portions in which the voltage rapidly changes from the maximum value to the minimum value in short time intervals. If the condition expressed by the expression (3) is met, no oxide film growth takes place on the cathode sheet 21 even when such rapidly changing current or voltage is applied to the cathode sheet 21. In prior art, a major attempt to improve the ripple insensitivity and the charge-and-discharge insensitivity of an electrolytic capacitor has been to fulfil the condition expressed by the expression (3). For example, it has been done to use a cathode sheet having a large capacitance per unit area, or a sheet with an additional oxide film intentionally pre-formed on it having a high withstand voltage. The term "ripple insensitivity" is used in this specification to represent a property of a sheet of, for example, aluminum, that an oxide film does not grow or hardly grow on the sheet when ripple current above an allowable magnitude is applied to the sheet. The term "charge-and-discharge insensitivity" used in this specification is a measure indicating how an oxide film does not grow when a large voltage difference occurs between charging and discharging of a capacitor.

There is a limit to the prior art improvement of the ripple insensitivity and the charge-and-discharge insensitivity of an electrolytic capacitor. The inventors have conducted experiments on electrolytic capacitors which have been judged to be sufficiently ripple and charge-and-discharge insensitive. They have made analysis of such electrolytic capacitors used in circuits in which ripple current having a magnitude larger than an allowable limit is applied, and electrolytic capacitors used in circuits in which the difference between the voltage to which the capacitors are charged and the voltage to which the capacitors are discharged is large. They have found that even in such capacitors employing ideal or approximately ideal cathode sheets 21, a film-forming reaction takes place on the cathode lead tabs 22 and adjacent portions of the cathode sheet 21, causing gas to be generated within the capacitor, which undesirably results in the opening of the explosion preventing valve 7 due to the rise of the pressure within the capacitor.

Therefore, an object of the present invention is to provide an electrolytic capacitor having improved charge-discharge insensitivity and ripple insensitivity against charging and discharging and against conduction of ripple current, by virtue of a structure which can prevent production of an oxide film on a cathode side during discharging of the capacitor.

SUMMARY OF THE INVENTION

After the above-described experiments, the inventors concluded that the reason why oxide films are produced on the portions of the cathode sheet in the vicinity of the cathode lead tabs of the electrolytic capacitors used in the above-discussed types of circuits is that since prior art cathode lead tabs provide a low apparent capacitance per unit area, a high voltage is applied to the cathode lead tabs and their vicinity when discharge current flows through the cathode lead tabs.

According to the present invention, cathode lead tabs have their surfaces roughened. Alternatively, pieces of aluminum foil having a roughened surface may be disposed to overlie the cathode lead tabs. (Hereinafter, each of such pieces of aluminum foil overlying the cathode lead tabs is frequently referred to as "overlying aluminum sheet".) The roughened surfaces provide increased electrostatic capacitance per unit area for the terminal section. At least that portion of each cathode lead tab or overlying aluminum sheet which contacts a separator sheet must be roughened beforehand.

An aluminum electrolytic capacitor uses aluminum foil for a cathode sheet. Aluminum foil has an oxide film on its surface which is formed through reaction of aluminum with water in air or in an electrolytic solution. Such oxide film has a withstand voltage on the order of 1.0 V. Aluminum foil, when used for a cathode sheet, may be electrochemically processed with a low voltage of several volts or less applied thereto to thereby form an oxide film having a withstand voltage of several volts. Such aluminum foil exhibits electrostatic capacitance associated with the oxide film. Such electrostatic capacitance can be increased to from five to fifty times by roughening the surface of the aluminum foil. If a cathode lead tab with a smooth surface is stacked on the roughened cathode sheet, the capacitance per unit area exhibited by the smooth cathode lead tab is only 0.2 to 0.02 times as large as the capacitance per unit area exhibited by the roughened cathode sheet.

Then, if ripple current having a magnitude far above an allowable magnitude is applied to an electrolytic capacitor with such cathode sheet and cathode lead tabs, or if the capacitor is charged and discharged with a large voltage difference between the charged state and the discharged state, a high voltage may be applied on the cathode lead tabs and those portions of the cathode sheet which are adjacent to the cathode lead tabs, resulting in an reaction to grow an oxide film, which, in turn, cause gas to be generated.

According to the present invention, a surface of each cathode lead tab, which is disposed on a cathode sheet having an oxide film thereon as described above, is roughened to thereby increase the capacitance per unit area exhibited by the lead tab. Alternatively, each cathode lead tab disposed on the cathode sheet with an oxide film may be covered by an overlying aluminum sheet formed of aluminum foil having a roughened outer surface. This can advantageously prevent the cathode lead tabs or overlying aluminum sheets and adjacent portions of the cathode sheet from receiving a high voltage which would cause an oxide film growing reaction on the surface thereof. In order to make it surer that such advantage can be obtained, the surface of each cathode lead tab or overlying aluminum sheet is preferably roughened to such an extent that a capacitance per unit area at least 0.3 times as large as the one exhibited by the cathode sheet can be provided.

BRIEF DESCRIPTION OF THE DRAWINGS

FIG. 7 is a table showing the performance of electrolytic capacitors according to the present invention in comparison with the performance of prior art electrolytic capacitors.

The same reference numerals used in the drawings denote the same or similar components or functions.

DETAILED DESCRIPTION OF EMBODIMENTS

According to the present invention, a cathode terminal structure may include a cathode sheet and cathode lead tabs disposed on and connected to the cathode sheet. Alternatively, a cathode terminal structure may include a cathode sheet, cathode lead tabs disposed on the cathode sheet, and aluminum sheets made of aluminum foil overlying respective ones of the cathode lead tabs. In the former, the cathode lead tabs are connected to the cathode sheet by "needling" or welding, and at least that surface of each lead tab which is to be in contact with a separator has been roughened beforehand. In the latter, the cathode lead tabs and the overlying aluminum sheets may be separately connected to the cathode sheet by "needling" or welding, or the cathode lead tabs and the overlying aluminum sheets may be stacked on the cathode sheet and, then, connected together by "needling" or welding. In the latter case, at least those surfaces of the respective overlying aluminum sheets which contact with the separator have been roughened beforehand.

EXAMPLE 1

Figure 3:
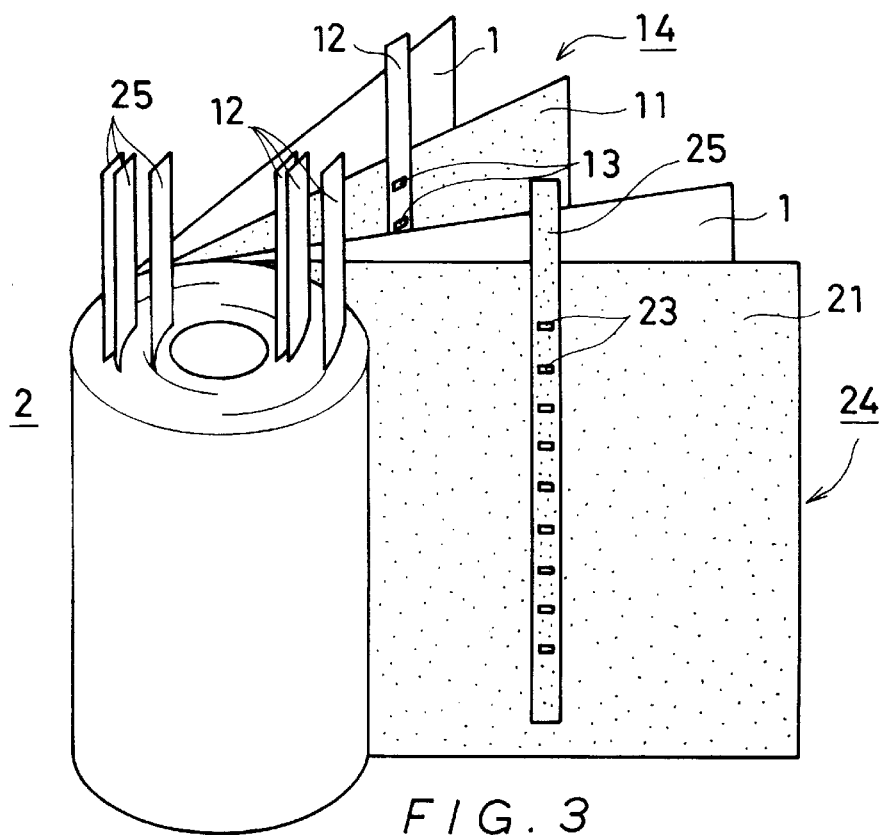
FIG. 3 is a perspective view similar to FIG. 1, showing the structure of an electrolytic capacitor according to an embodiment of the present invention in which surfaces of cathode lead tabs are roughened.

An electrolytic capacitor element 2 fabricated according to one embodiment of the present invention is shown in FIG. 3. The capacitor element 2 included an anode 14 and a cathode 24, which were rolled with two separator sheets 1 disposed between the adjacent surfaces of the anode 14 and cathode 24. The roll was the impregnated with an organic acid electrolytic solution.

The anode 14 included an anode sheet 11 with roughened surfaces. The anode sheet 11 had a withstand voltage of 520 V and exhibited a capacitance per unit area of 0.5 $\mu F/cm^2$. The anode 14 included further anode lead tabs 12 which were formed of an aluminum thin sheet having a smooth surface. Each of the anode lead tabs 12 was connected to the anode sheet 11 by, for example, "needling" at locations 13.

The cathode 24 included a cathode sheet 21 with roughened surfaces. The cathode sheet 21 had an oxide film formed on each surface thereof. The oxide film had a withstand voltage of 1.0 V and exhibited a capacitance per unit area of 50 $\mu F/cm^2$. The cathode 24 further included cathode lead tabs 25, which were formed of an aluminum thin sheet and disposed on the cathode sheet. The outer surface of each of the cathode lead tabs had been roughened. The roughened surface had a withstand voltage of 1.0 V and exhibited a capacitance per unit area of 15 $\mu F/cm^2$. Each of the cathode lead tabs 25 was connected to the cathode sheet 21 by "needling" at locations 23.

Figure 1:
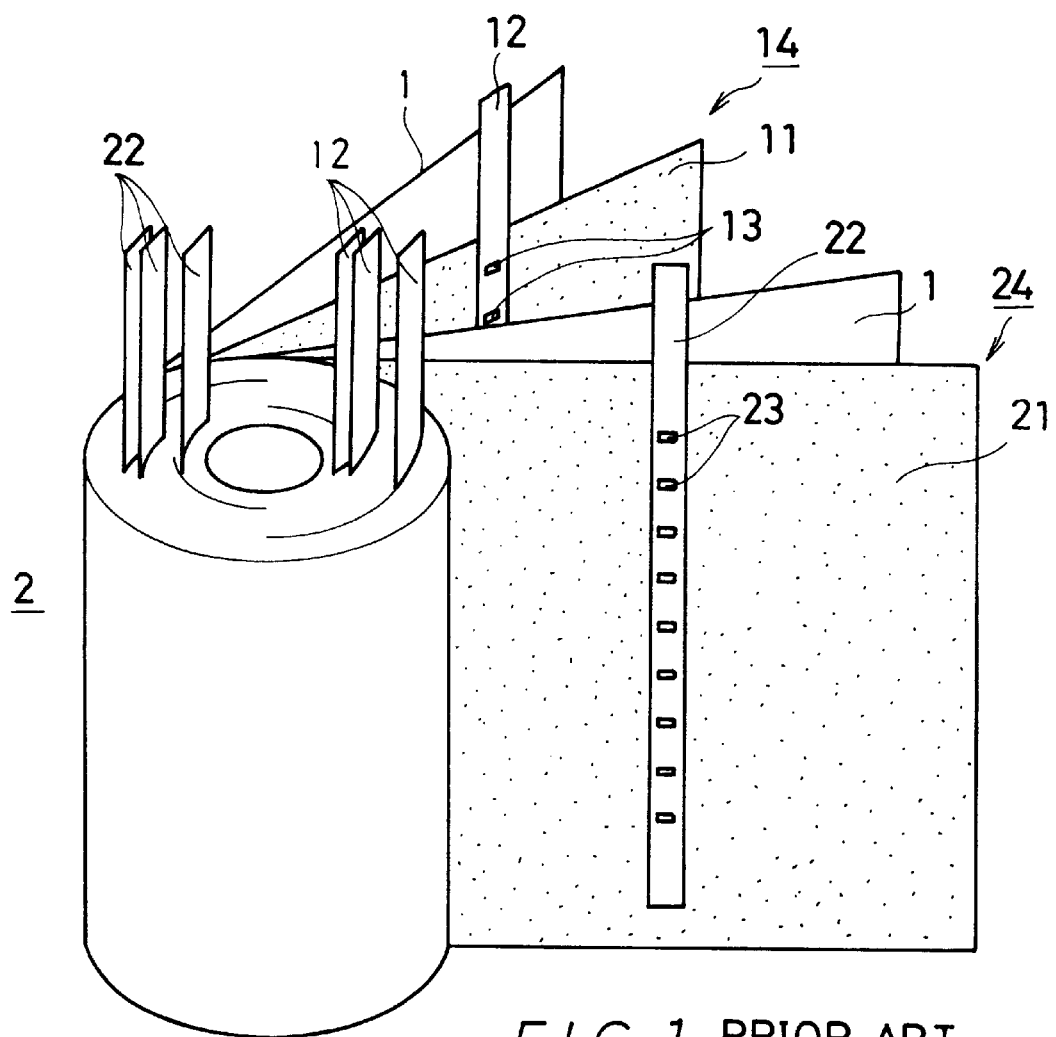
FIG. 1 is a perspective view of a prior art capacitor element having their anode, cathode and separator sheets partly unrolled.
Figure 2:
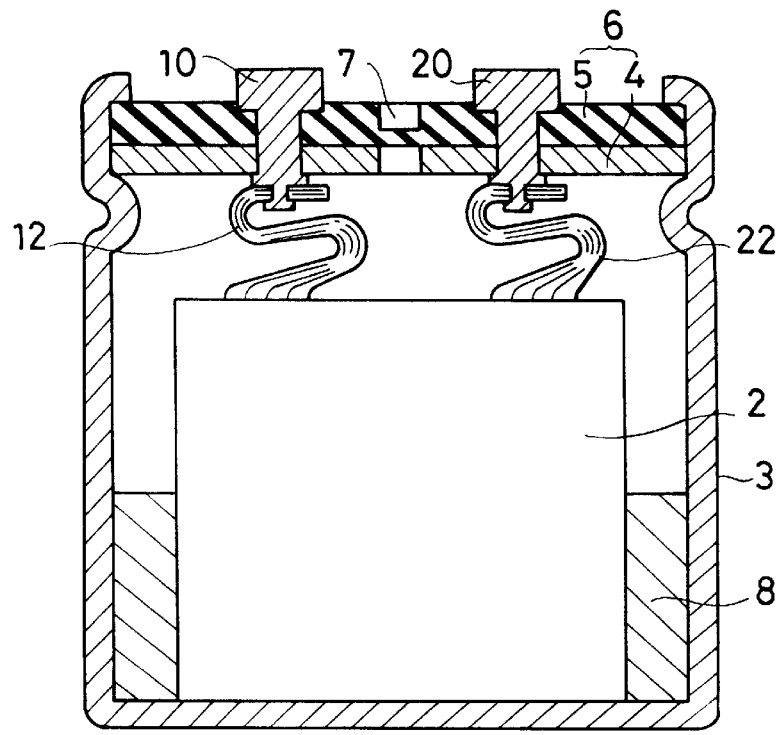
FIG. 2 is a cross-sectional view of an electrolytic capacitor including the element shown in FIG. 1.

The capacitor element 2 was sealed into an aluminum casing, like the casing 3 shown in FIG. 2, which resulted in an electrolytic capacitor having a voltage rating of 400 V and capacitance of 1500 $\mu F$, and having a diameter of 50 mm and a height of 100 mm.

EXAMPLES 2–5

Figure 4:
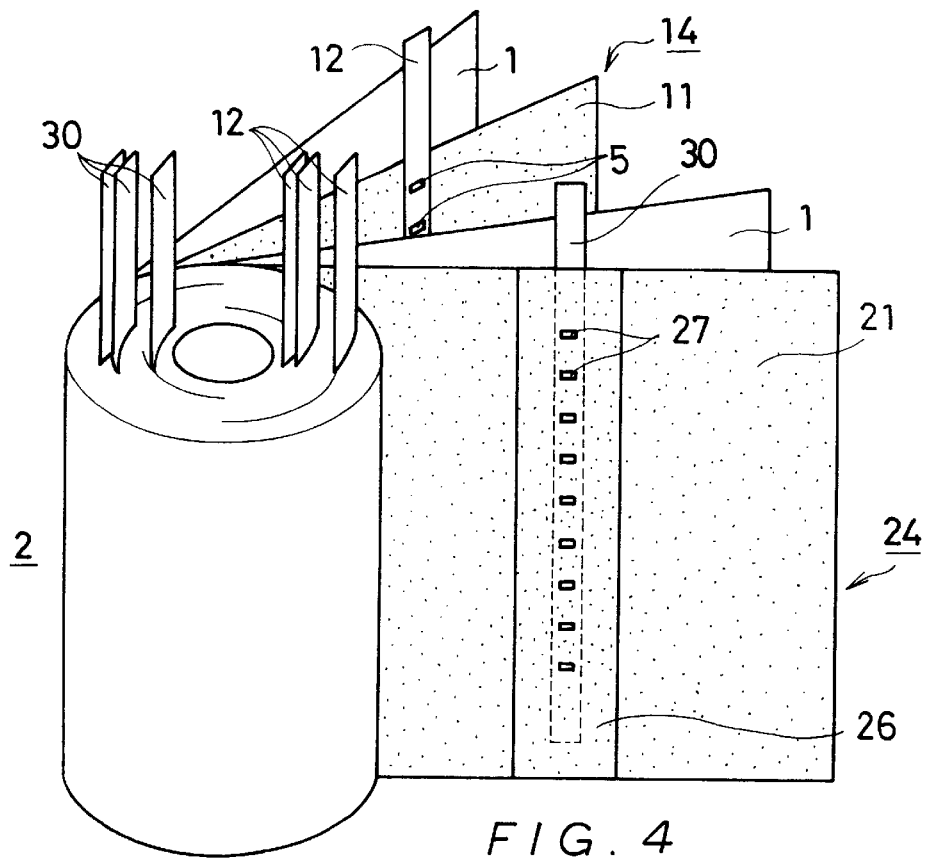
FIG. 4 is a perspective view similar to FIG. 1, showing the structure of an electrolytic capacitor according to another embodiment of the present invention in which a thin aluminum sheet having a roughened surface overlies a surface of each of cathode lead tabs.

As shown in FIG. 4, cathode lead tabs 30 each in the form of a thin sheet with smooth surfaces were disposed on the roughened cathode sheet 21. A piece of aluminum foil (overlying aluminum sheet) 26 was disposed to overlie each cathode lead tab 30. Each overlying aluminum sheet 26 has its outer surface roughened. The cathode sheet 21, the cathode lead tabs 30 and the overlying aluminum sheets 26 were connected together by "needling" at locations 27, which resulted in a cathode 24.

As shown in the table of FIG. 7, Examples 2 through 5 were same except for the capacitance per unit area at the surfaces of the overlying aluminum sheets 26. The structures of the remaining portions were the same as those of the capacitor element shown in FIG. 3.

EXAMPLES 6 and 7

The withstand voltage of an aluminum sheet and its capacitance per unit area can be changed by electrolytic processing. Examples 6 and 7 used overlying aluminum sheets 26 having outer surfaces roughened to the same extent as the ones used in Example 4 so that they exhibited a capacitance per unit area of 50 $\mu F/cm^2$. The roughened overlying aluminum sheets 26 were electrolytically processed to change their withstand voltage and capacitance per unit area to the ones shown in the table in FIG. 7. The remaining structure is the same as those of Examples 2–5.

EXAMPLES 8–13

Figure 5:
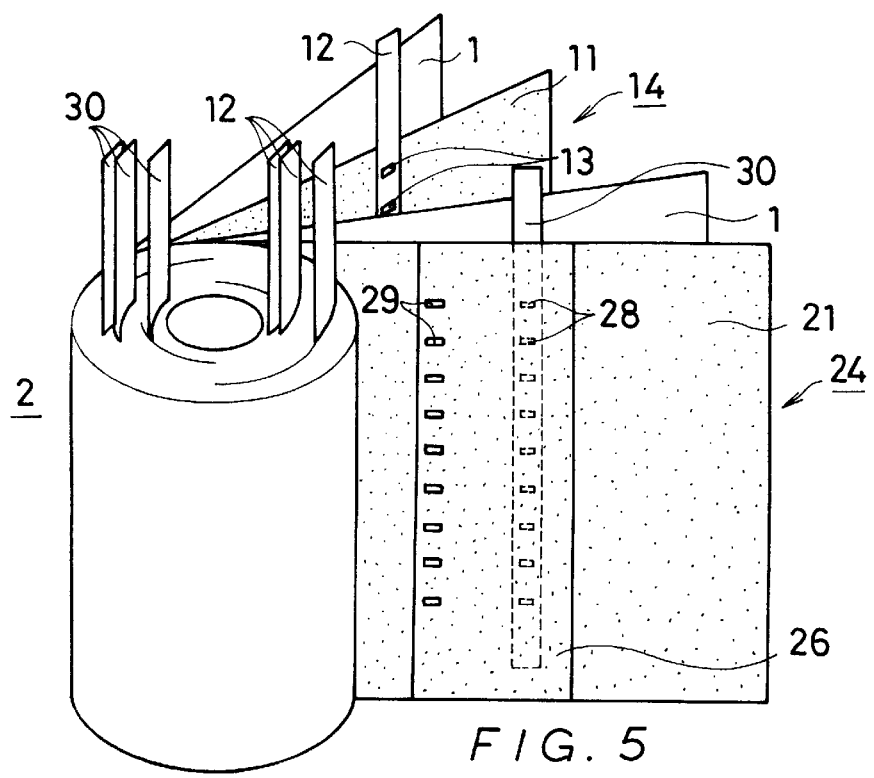
FIG. 5 is a perspective view of an electrolytic capacitor according to still another embodiment of the present invention, which is similar to the capacitor shown in FIG. 4, but the cathode sheet, the cathode lead tabs and the overlying aluminum sheets are connected in a different manner than the one shown in FIG. 4.
Figure 6A:
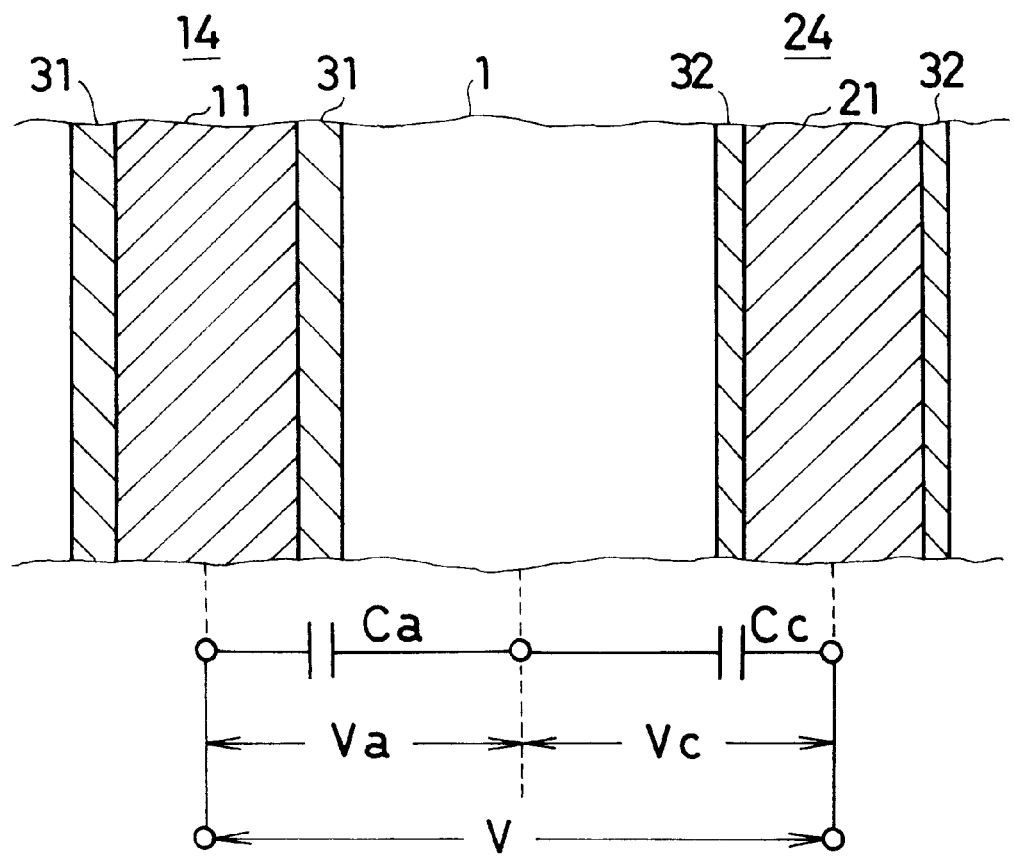
FIGS. 6(*a*) and 6(*b*) are useable in explaining the basic operation of an electrolytic capacitor in general, in which FIG. 6(*a*) schematically shows part of a basic structure of an electrolytic capacitor, and FIG. 6(*b*) is a schematic circuit diagram of the part shown in FIG. 6(*a*) during discharging.
Figure 6B:
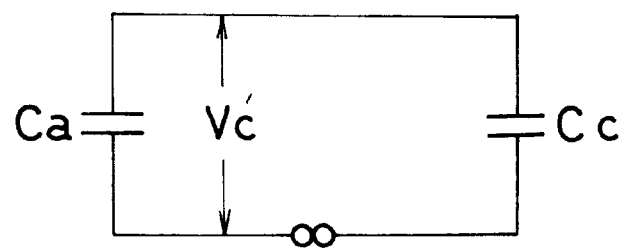

As shown in FIG. 5, aluminum cathode lead tabs 30 were arranged on an aluminum cathode sheet 21 and connected to the sheet 21 by "needling" at locations 28. An aluminum thin sheet 26 with a roughened outer surface was disposed to overlie each of the cathode lead tabs 30 and connected to the cathode sheet 21 by "needling" at locations 29 different from the locations 28. This provided a cathode 24. The remaining structure was the same as those of Examples 2–7.

Comparison Example 1

An electrolytic capacitor according to prior art was fabricated for the purpose of comparison with the capacitors fabricated in accordance with the present invention. The capacitor of Comparison Example 1 was fabricated in the same manner as Example 1. The surfaces of the cathode lead tabs 22 were smooth and had an oxide film formed thereon by spontaneous oxidation. The oxide film exhibited a capacitance per unit area of about 3 $\mu F/cm^2$ across

Comparison Example 2

An electrolytic capacitor of Comparison Example 2 had almost the same structure as the capacitor of Example 1, except that the cathode lead tabs 22 were roughened less.

Comparison Examples 3 and 4

Electrolytic capacitors of Comparison Examples 3 and 4 had almost the same structures as the capacitors of Examples 2 through 5, respectively, except that their aluminum sheets 26 overlying the cathode lead tabs 30 were roughened less than the aluminum sheets 26 of Examples 2 through 5.

Test and Result

Thirty electrolytic capacitors fabricated according to each of Examples 1–13 and Comparison Examples 1–4 were tested by subjecting them to ten million (10,000,000) cycles of charging and discharging. In each cycle, the capacitors were charged by applying a DC voltage of 400 V to them through a charging resistor of 20 Ω for one second and, then, discharged through a discharging resistor of 2 kΩ for one second. The test was for determining the number of defective capacitors of which explosion preventing valves were operated in the test. The result of the test is shown in the table of FIG. 7.

As is seen from the table shown in FIG. 7, all of the electrolytic capacitors according to the present invention passed the test. In contrast, none of the prior art electrolytic capacitors made according to Comparison Example 1 passed the test. Further, part of the electrolytic capacitors according to Comparison Example 2, which had insufficiently roughened cathode lead tabs, and part of the electrolytic capacitors according to Comparison Examples 3 and 4, which had insufficiently roughened overlying aluminum sheets, failed the test.

Also, it is seen that the surfaces of the cathode lead tabs or the surfaces of the aluminum sheets overlying the cathode lead tabs should be roughened preferably to such an extent that the capacitance per unit area exhibited by the surface oxide films on the tabs or overlying aluminum sheets is more than 0.3 times as large as the capacitance per unit area exhibited by the cathode sheet.

As described above, electrolytic capacitors according to the present invention include cathode lead tabs of which the surfaces contacting the separator are roughened, or include cathode lead tabs of which surfaces are covered with aluminum foil having at least its surface contacting the separator roughened. With this arrangement, the electrolytic reaction accompanied by gas generation, which could cause the explosion preventing valve to operate, does not occur within the electrolytic capacitors even when large ripple current flows or when the difference between the charge and discharge voltages is large.

In the above-described embodiments, the stack of the cathode, the anode, the separator, the anode and cathode lead tabs are rolled into a cylindrical shape, but it may be used without being rolled.

What is claimed is:

1. An aluminum, electrolytic capacitor comprising:
   an anode sheet of aluminum having opposing major surfaces which have been roughened and have an oxide film formed thereon by anodic oxidation;
   a first separator impregnated with an electrolytic solution;
   a cathode sheet of aluminum having opposing major surfaces which have been roughened and have an oxide film spontaneously or electrochemically formed thereon; and
   a second separator impregnated with said electrolytic solution;
   said anode sheet, said first separator, said cathode sheet and said second separator being arranged into a stack with either said cathode sheet being disposed between said first and second separators, or said anode sheet being disposed between said first and second separators, said stack being rolled;
   an anode terminal section being disposed on a portion of one of said rougnened major surfaces of said anode sheet;
   a cathode terminal section being disposed on a portion of one of said roughened major surfaces of said cathode sheet, at least that one of opposing major surfaces of said cathode terminal section which is in contact with said first or second separator being roughened.

2. The aluminum electrolytic capacitor according to claim 1 wherein part of a cathode lead tab formed of an aluminum sheet is disposed to overlie said cathode sheet and electrically and mechanically connected to said cathode sheet; and said cathode terminal section comprises said part of said cathode lead tab overlying said cathode sheet.

3. The aluminum electrolytic capacitor according to claim 1 wherein a stack of a cathode lead tab formed of an aluminum sheet and an aluminum sheet overlying said cathode lead tab is electrically and mechanically connected to said cathode sheet, and said cathode terminal section comprises a part of said cathode lead tab overlying said cathode sheet and said overlying aluminum sheet.

4. The aluminum electrolytic capacitor according to claim 1 wherein said roughened surface of said cathode terminal section has an electrochemically formed, relatively thin oxide film thereon.

5. The aluminum electrolytic capacitor according to claim 1 wherein said cathode terminal section has a spontaneously or electrochemically formed oxide film, the electrostatic capacitance per unit area associated with said oxide film being more than 0.3. times as large as the electrostatic capacitance per unit area provided by an spontaneously formed oxide film on the surface of said cathode sheet.

6. The aluminum electrolytic capacitor according to claim 1 wherein said cathode terminal section comprises a cathode lead tab formed of an aluminum sheet connected to said cathode sheet by "needling" or welding, and an aluminum sheet overlying said cathode lead tab, said overlying aluminum sheet being connected to said cathode sheet b "needling" or welding.

7. The aluminum electrolytic capacitor according to claim 1 wherein said cathode terminal section comprises a cathode lead tab formed of an aluminum sheet and an aluminum sheet overlying said cathode lead tab, said cathode lead tab and said overlying aluminum sheet connected together to said cathode sheet by "needling" or welding.

* * * * *